United States Patent [19]

McNamara et al.

[11] Patent Number: 5,084,903
[45] Date of Patent: Jan. 28, 1992

[54] MODULATION AND DEMODULATION SYSTEM EMPLOYING AM-PSK AND QPSK COMMUNICATION SYSTEM USING DIGITAL SIGNALS

[75] Inventors: Robert P. McNamara, San Jose; Timothy P. Murphy, Mountain View; James C. Long, Sunnyvale, all of Calif.

[73] Assignee: First Pacific Networks, Sunnyvale, Calif.

[21] Appl. No.: 631,760

[22] Filed: Dec. 21, 1990

Related U.S. Application Data

[63] Continuation of Ser. No. 317,213, Feb. 28, 1989, abandoned.

[51] Int. Cl.⁵ .................... H04L 25/34; H04L 25/49; H04L 27/18; H04J 1/00
[52] U.S. Cl. ........................................ 375/18; 370/24; 370/69.1; 375/20; 375/42; 375/54; 375/56
[58] Field of Search ...................... 370/11, 12, 19, 20, 370/50, 69.1, 71, 73, 124, 120, 121, 122, 24, 30, 85.1, 85.9, 85.11, 36, 76; 375/54, 38, 39, 41, 42, 52, 48, 86, 88, 18, 20, 53, 56; 340/825.58; 455/5

[56] References Cited

U.S. PATENT DOCUMENTS

| | | | |
|---|---|---|---|
| 4,313,205 | 1/1982 | Rhodes | 375/86 |
| 4,359,692 | 11/1982 | Ryan | 329/50 |
| 4,498,169 | 2/1985 | Rozmus | 370/85 |
| 4,520,492 | 5/1985 | Weber | 375/86 |
| 4,580,276 | 4/1986 | Andruzzi, Jr. et al. | 375/42 |
| 4,596,011 | 6/1986 | Kobayashi et al. | 370/85 |
| 4,613,976 | 9/1986 | Sewerinson et al. | 375/52 |
| 4,639,911 | 1/1987 | Roza et al. | 370/69.1 |
| 4,677,627 | 6/1987 | Hong | 375/42 |
| 4,680,775 | 7/1987 | Exarque et al. | 375/54 |
| 4,752,954 | 6/1988 | Masuko | 455/5 |
| 4,860,379 | 8/1989 | Schoeneberger et al. | 455/5 |

OTHER PUBLICATIONS

I. Korn, "Digital Communication", Van Nostrand Reinhold (1985), Chapter 9, (pp. 537-556).

Primary Examiner—Benedict V. Safourek
Assistant Examiner—Alpus H. Hsu
Attorney, Agent, or Firm—Townsend and Townsend

[57] ABSTRACT

A communication network having a first broadband communications channel or transmitting bus and a second broadband communications channel or receiving bus, wherein the first broadband communications channel passes information upstream to a head end employing an offset quadrature phase shift keyed (OQPSK) modulator in bursts, and the second broadband communications channel passes information downstream from the head end to remote nodes in a continuous bit stream. All nodes of the system are coupled to both the first communications channel and the second communications channel. According to the invention, modulation of signals applied to the first communication channel is optimized for burst communication from a plurality of sources to central control at the head end, and modulation applied to the second communications channel is optimized for continuous communication from the central source to a target node. In one specific embodiment, the communication between the central unit (head end) and any one of a choice of target nodes through the second communication channel is by means of three-level class one partial response AM-PSK modulated onto a carrier, which is optimized for continuous operation.

13 Claims, 4 Drawing Sheets

MODULATION AND DEMODULATION SYSTEM EMPLOYING AM-PSK AND QPSK COMMUNICATION SYSTEM USING DIGITAL SIGNALS

This is a continuation of application Ser. No. 07/317,213, filed Feb. 28, 1989, now abandoned.

BACKGROUND OF THE INVENTION

1. Field of the Invention

The present invention relates to a local area network communication systems suitable for use in combination of time-division multiplexing and frequency-division multiplexing in a multiple-channel broadband communications environment.

Many offices today use a network for transmission of data between personal computers, terminals and other devices within the office. Several types of architectures are used. In a star network, all nodes are coupled to a central point of the star, which provides centralized control of the flow of data. The central control on such a system can multiplex data in time from different nodes by alternately holding data in a buffer from one or the other transmitting node until a timeslot is available. A central control unit provides the synchronization necessary to insert data into assigned or available timeslots. One limitation of the star network is that the bandwidth available through the switch matrix is limited. Hence, means must be provided for multiple nodes to transmit data to the central control unit within a common broadband frequency channel.

A further system architecture employed for data communication is a token ring network. In a token ring network, a single cable or communication line is passed through each and every node, and a token packet is relayed from one node to the next, with the node desiring to transmit holding onto the token packet until its communication period is terminated. A node cannot transmit unless it has the token, and therefore, only one node is permitted to transmit at any time. This type of time-division multiplexing transmits data in irregular bursts, rather than in assigned time slots. This type of transmission is appropriate for data communications which typically occur in infrequent long bursts. Voice communications, on the other hand, require a substantially continuous connection over an extended period of time.

A still further data communication system architecture often employed for data communication is the Ethernet system. In the Ethernet system, a data node listens to see if the channel is in use before transmitting. While transmitting, the data node listens to determine if the data transmitted is received in the same form. If the received data differs, then it is assumed another node transmitted at the same time, resulting in a collision, and thus in scrambled data. The transmitting node then retransmits a packet at a random time later. Thus, neither central control of the network bandwidth acquisition of time slots nor central timing is needed.

2. Description of the Prior Art

The following patent was uncovered in a search for quadrature phase shift keyed (QPSK) demodulation systems as they might relate to the subject invention:

Rapid Acquisition Shift Keyed Signal Demodulator, U.S. Pat. No. 4,359,692. This patent describes a prior demodulator suitable for QPSK which requires a voltage controlled oscillator in the acquisition loop. The present invention does not require a voltage controlled oscillator in the acquisition loop and as a consequence is much faster in reaction.

The following patents were uncovered in reference to a Maximum Likelihood Detection Circuit as referred to in this application:

Carrier Synchronization and Symbol Synchronization in Offset QPSK Burst Communications, U.S. Pat. No. 4,313,205. This patent describes a carrier synchronization scheme based on average phase over a periodic interval and wherein phase synchronization is achieved by reliance on the filtered and demodulated upper sideband of the output of a delay and multiply circuit.

Method for Determining the Optimum Sampling Times for a QPSK or QAM Received Signal, U.S. Pat. No. 4,520,492. This patent describes a detector system wherein the amplitude of two quadrature components of a received signal are coupled and the point of identical amplitude is selected as the point of sampling.

SUMMARY OF THE INVENTION

According to the invention a modulation and demodulation system is provided for a network having a first broadband communications channel or transmitting bus and a second broadband communications channel or receiving bus, wherein the first broadband communications channel is for passing information upstream in bursts to a head end and the second broadband communications channel is for passing information downstream continuously from the head end to remote nodes. All nodes of the system are coupled to both the first communications channel and to the second communications channel. According to the invention, modulation of signals applied to the first communication channel is optimized for burst communication from a plurality of sources to a central or head end node, and modulation applied to the second communications channel is optimized for continuous communication from the central node to a target node. Two-way voice communication and two-way data communication can be supported simultaneously through such a dual-channel system. A system according to the invention uses a relatively small number of channels available in a broadband environment such that it can coexist with third party equipment as used in a cable television or closed circuit television system employing coaxial cabling. In a specific embodiment of the invention, communication between remote nodes and a central control unit is provided via differential offset quadrature phase shift keyed (QPSK) modulation on a carrier wherein packets are communicated as bursts. This type of modulation provides a one bit per Hertz efficiency.

In contrast, the communication between the central unit (head end) and any one of a choice of target nodes through the second communication channel is by means of three-level class one partial response AM-PSK modulated onto a carrier, which is optimized for continuous operation. Class one partial response is an ideal format where continuous communication is contemplated because the modulator and demodulator are simple, and the demodulator is particularly inexpensive, which makes it suitable for use in a large number of slave receivers. In addition, means are provided for synchronizing the phase of signals received from remote nodes due to differences in distances between the remote nodes and the head end.

These and other aspects of the invention are clarified in the following detailed description taken in connection with the accompanying drawings.

DESCRIPTION OF SPECIFIC EMBODIMENTS

Figure 1:
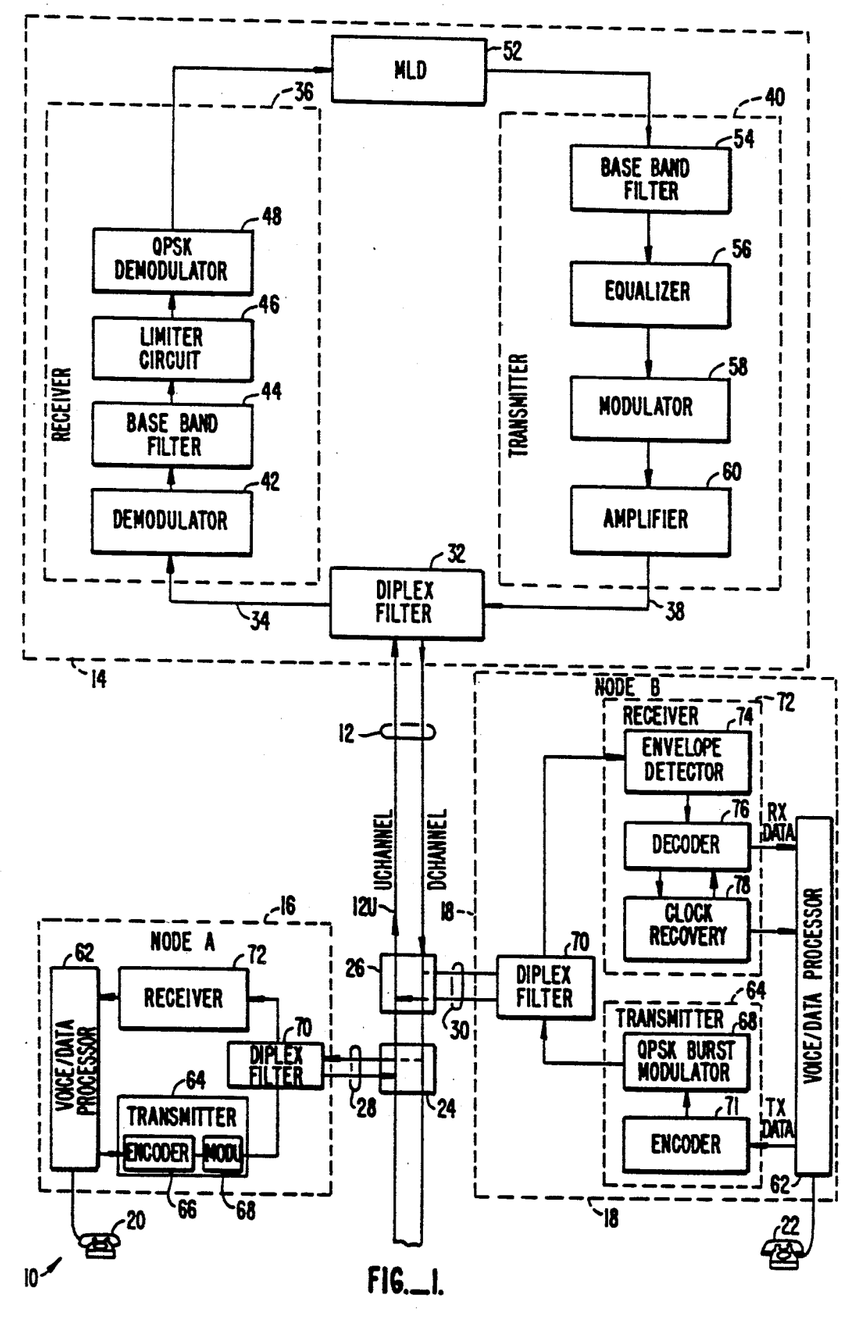
FIG. 1 is a block diagram of a communications system according to the invention.

Referring to FIG. 1, there is shown a communication system in accordance with the invention which comprises wideband media, preferably broadband coaxial or fiber optic cables, capable of supporting a plurality of channels simultaneously, herein designed medium 12, a head end device, commonly designated the head end retransmission unit (HRU) 14, and a plurality of node devices, herein node device A 16 and node device B 18 by way of example. Node devices A and B are, for example, voice interface units (VIU), each of which is respectively coupled to a telephone 20, 22. In addition, there may be other nodes, not shown, for connecting to the public switch telephone network, to a network manager or the like.

The wideband media herein contemplate a first broadband communications medium, a second broadband communications medium, and any other physical structure or arrangement whereby communication of information of more than one type can be carried out independently. The broadband cable designated herein medium 12 contemplates a structure of a plurality of video channels, each one of the video channels for example constituting a single broadband communications medium.

Each of the nodes is connected to the medium 12 through taps 24, 26, respectively, which in turn feed a tap transmission line 28, 30, respectively. In the preferred embodiment, the tap transmission lines 28, 30 are of the same medium as medium 12, capable of supporting multiple channels of communication.

The medium 12 and the tap transmission lines 28 and 30 support band-limited channels of communication, typically of about 6 MHz bandwidth per channel. In a coaxial embodiment, there are two groups of channels, typically eight channels in each group designed upstream channels and downstream channels. Upstream channels may, for example, be selected in the frequency spectrum between about 56 MHz and 100 MHz. The downstream channels may, for example, be selected to be in the frequency region between about 145 MHz and 195 MHz, all preferably having modulators and demodulators designed to operate within the defined spectrum of CATV.

According to the invention, signals originating at the node A 16 are supplied through tap 24 to one of a selected upstream channels 12U of the medium 12 to the HRU 14 wherein the signal is processed and rebroadcast to a downstream channel 12D of the medium 12 wherein it is intercepted at node B 18, processed and provided to the designated output device, such as telephone 22. According to the invention, the modulation scheme supported on the upstream channel 12U is different than the modulation scheme supported on the downstream channel 12D, the upstream channel 12U supporting a modulation scheme of burst communication, and the downstream channel 12D supporting a modulation scheme of continuous broadcast communication. In the preferred embodiment, the modulation schemes have an efficiency of one bit per Hertz (B/Hz), and the downstream channel contains sufficient information to recover a clock signal.

The HRU 14 comprises a diplex filter 32, coupled to the medium 12 for separating the incoming signals on the upstream channel 12U from signals placed on the downstream channel 12D. The diplex filter has an output coupled through a signal line 34 to a receiver 36 and has an input coupled to a signal channel 38 connecting it with a transmitter 40. The receiver 36 is a receiver suited to demodulate and detect a signal applied through the upstream channel 12U to the HRU 14. In a specific embodiment according to the invention, the receiver 36 comprises a superhetrodyne frequency shifter 42 whereby the broadband signal is shifted to an intermediate frequency, a bandpass filter 44 coupled to receive the output of the superhetrodyne frequency shifter 42, a limiter circuit 46 coupled to receive the output of the baseband filter 44, a QPSK demodulator circuit 48 coupled to receive the output of the limiter circuit 46. The output of the QPSK demodulator 48 is provided to a maximum likelihood detector (MLD) 52, the function of which is to adjust in time the bit position of each received signal so that the system clock can strobe received data in the middle of the signal representing the digital bit. Its output is provided to a transmitter 40, in a preferred embodiment, in a three-level code, initially to a baseband filter 54. The output of the baseband filter 54 of the transmitter 40 is provided to an equalizer 56, the output of which is provided to a modulator 58. The modulator 58 modulates the data signal to the chosen downstream channel frequency for transmission. The output of the modulator 58 is provided to an amplifier 60, which, in one or more amplifier stages, generates sufficient RF signal output to support signals in the downstream channel 12D. The output of the amplifier 60 is provided on signal line 38 to the diplex filter 32 which in turn directs the signal to the downstream channel 12D.

Signals are supplied to the medium 12 from the nodes, for example, from node device A 16. Node device A 16 receives a signal in appropriate format from a telephone or data source, which is formatted in an appropriate voice/data processor 62. The voice/data processor 62 generates the formats with protocols necessary to supply the information in its appropriate hierarchy of transmission. The details of a the voice/ data processor 62 depend on the nature of protocols not directly relevant to the present invention.

Encoded data is applied from the voice/data processor 62 to a transmitter 64. The transmitter 64 includes an encoder 66 and a modulator 68 operative in accordance with a specific embodiment of the invention. The encoder 66 is coupled to receive a digital data stream from the voice/data processor 62 and to supply an encoded signal to the modulator 68, and the modulator 68 modulates the encoded signal to the appropriate channel of the upstream channel 12U. The output of the modulator 68 is supplied to a diplex filter 70 which is coupled to the tap transmission line 28. Signals received through the diplex filter 70 on the tap transmission line 28 from the downstream channel 12D are coupled to a receiver 72, which is a subsystem suited to receive signals on the downstream channel as encoded via MLD 52 of the HRU 14.

The subsystems and elements of the node B device 18 are identical to those of the node A device 16 and have been so designated. Referring to the node B device 18, an example of one specific receiver 72 in accordance with the invention, is illustrated. The receiver 72 of the node B device 18 comprises an envelope detector 74 coupled to receive signals from the diplex filter 70 and to provide a detected signal to a decoder 76 whereby received data is output to a voice data processor 62. Associated with a decoder 76 is a clock recovery circuit 78 which is operative to extract a clock signal from the received data and to apply the recovered clock to the decoder 76 as well as to the voice/data processor 62.

Figure 2:
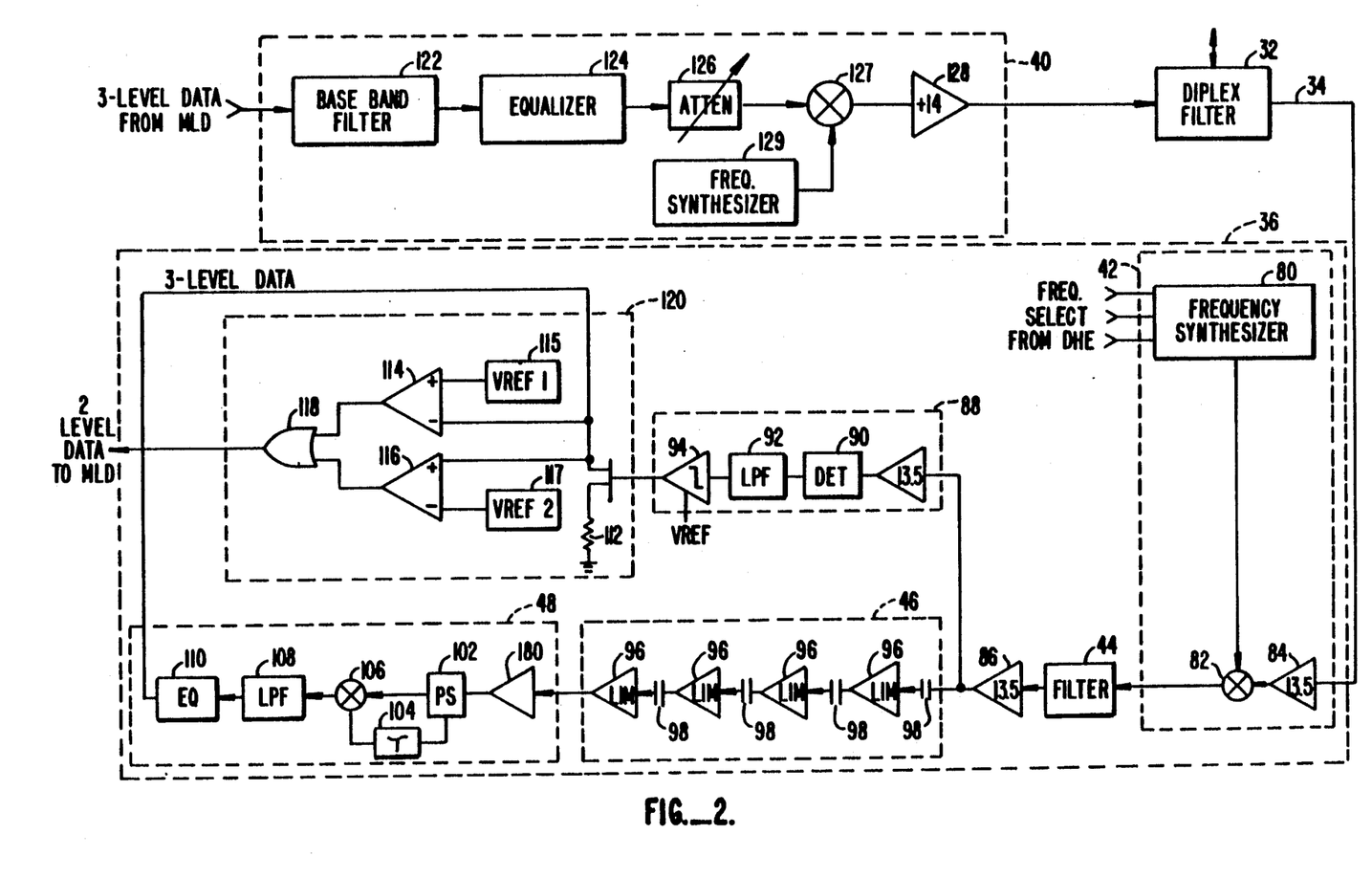
FIG. 2 is a block diagram of a specific embodiment of a receiver and transmitter within a head end or central control node according to the invention.

In accordance with a specific embodiment of the invention, the transmitter 64 of the node devices 16, 18 employs an offset quadrature phase shift keyed modulation which provides a bit efficiency of one bit per Hertz. FIG. 2 illustrates a specific embodiment of a receiver 36 and a transmitter 40 within the head end device 14. In accordance with the invention, the receiver 36 is adapted to receive digital data in a first structured form and the transmitter 40 is adapted to relay the same digital data in a structured form different from the received form. Within the receiver 36 is a superhetrodyne frequency shifter 42 which comprises a frequency synthesizer 80 coupled to a mixer 82 to which is supplied the input signal from signal line 34 through an amplifier 84. The output of the mixer 82 is provided to the bandpass filter 44, which is a filter network producing an output signal at an intermediate frequency (IF). The center frequency of the signal may, for example, be about 25 MHz, and the filter 44 may have a center frequency of about 25 MHz with a bandwidth of about 6 MHz.

The output of the baseband filter 44 may be provided to an amplifier 86 which in turn is coupled to carrier detector circuit 88 and also to a limiter circuit 46. The carrier detector circuit may include a conventional envelope detector 90, such as a diode, the output of which is coupled through a lowpass filter 92 to a comparator 94. The output of the comparator 94 is a two-level signal indicating presence or absence of a carrier.

The limiter circuit 46 may comprise a cascade of one or more limiter modules 96 which may optionally be a.c.-coupled through a capacitor 98 to one another and then coupled to the frequency discriminator circuit 48. Because there is no energy at d.c., there is no need to direct couple to the QPSK demodulator 48. The QPSK demodulator 48 includes, for example, an amplifier 100 coupled to a power splitter 102. The power splitter 102 has an output coupled through a delay circuit 104, which introduces, for example, a 200 nanosecond delay, and another output is provided to a mixer 106. A second input from the mixer 106 is from the delay circuit 104, thereby mixing two signals which in turn produces a product which is provided to a lowpass filter 108. The output of the lowpass filter 108 is provided to an equalizer 110, the output of which is two-level data representing 1 and 0. Data is fed to switch 50 which is activated when the carrier detect signal is logically True from carrier detector 88. The output on the switch 50 is provided to the MLD 52, as explained hereinbelow.

The transmitter section 40 comprises a baseband filter 122 which receives three-level input data from the MLD 52 and provides an output signal to an equalizer 124. The output of the equalizer 124 is fed through attenuator 126 as necessary to provide output level adjustment and thereafter, through a mixer 127 which also received an input from a frequency synthesizer 128 and produces an output at the desired output frequency for the downstream channel 12D (FIG. 1) through the amplifier 128 and the diplex filter 32. The modulation provided by the transmitter 40 is a three-level class one partial response encoding scheme AM-PSK modulated onto a carrier, which yields one bit per Hertz spectral efficiency. Class one partial response modulation is a preferred format for simple modulators and demodulators where the signal is operating is a continuous mode. Where the signal is continuous, a received signal can be averaged and used to produce an automatic gain control signal to provide the desired gain. The signal originates as a burst signal at the head end. However, in the MLD 52, the signal is merged with a head-end pseudo signal consisting of a repetitive bit pattern of, for example, bit stream of 1 0 1 0 1 0 in the preferred implementation. Information from the source of burst signal is merged to provide the desired encoding. Thus, the head end transmitter 40 always generates and transmits a continuous carrier to the downstream channel 12D.

Figure 3:
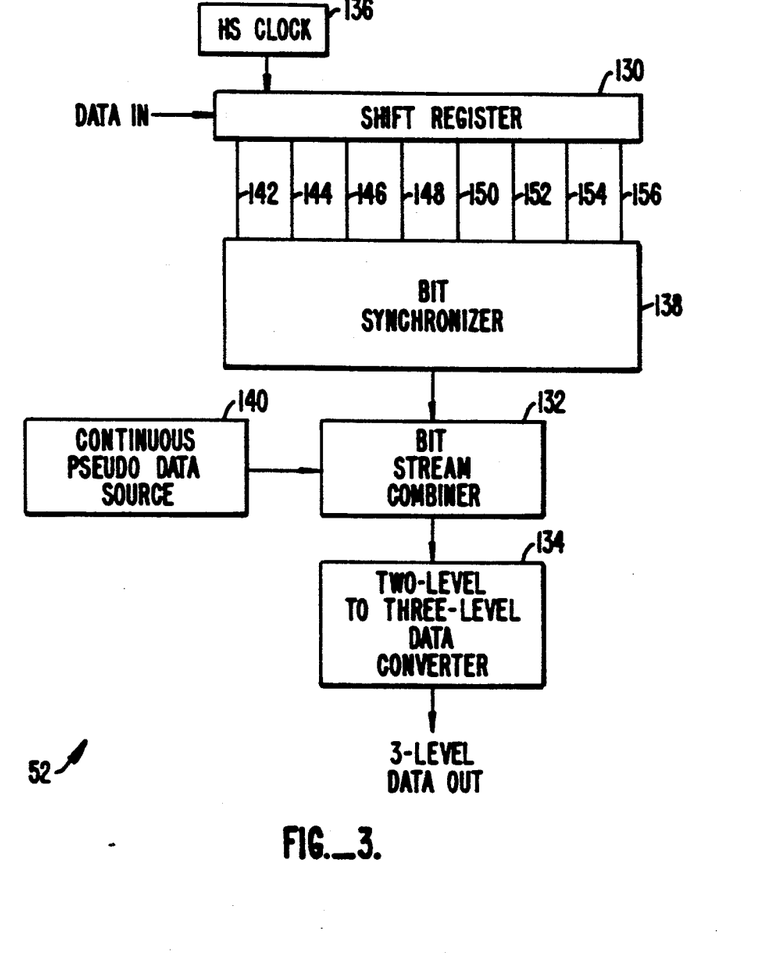
FIG. 3 is a block diagram of a maximum likelihood detector (MLD) according to the invention.

Referring to FIG. 3, there is shown a block diagram of one type of maximum likelihood detector (MLD) 52 suitable for use in accordance with the invention. The MLD 52 comprises a shift register 130, a bit stream combiner 132 and a two-level to three-level data converter 134. The shift register 130 has associated therewith a high-speed clock 136 and a bit synchronizer 138. The bit stream combiner 132 has associated therewith a continuous pseudo data source 140, a function of which is to provide a continuous string of pseudo data, for example, 1 0 1 0 1 0 format data in a pseudo-idle state. The bit stream combiner combines data received from the continuous pseudo data source 140 and data received from the shift register 130 into a continuous data stream. The continuous data steam is then provided to the data converter 134 where two level data is converted to three level data. The output of the data converter 134 is coupled to the transmitter 40 of the HRU 14.

The purpose of the MLD 52 is to align data for optimum reception. The various signals received in burst mode through the HRU receiver 36. Each exhibit different phases as a result of differences in distance along the upstream channel 12U from the HRU 14, as well as differences in filter delays and differences in the phase of any local clock. The MLD 52 adjusts for differences in the phase of the input data so that the system clock used in connection with receiving the data in a synchronous format can strobe the received data at or near the midpoint of the bit in the bit stream. To this end, the shift register 130 is clocked by a high speed clock 136 at, for example, eight times the input data rate whereby each input bit is shifted to eight possible positions in turn for output at a selected tap 142, 144, 146, 148, 150, 152, 154 or 156. In the specific embodiment, each tap of the shift register thus presents an output data stream differing in time delay by one eight bit from the adjacent tap. The bit synchronizer 138 monitors each one of the taps and selects by means of appropriate optimization a bit stream from one of the taps, providing as its output a bit stream to the bit stream combiner 132. The bit synchronizer 138 may, for example, include a multiplexer and means for checking each of the input bit streams for errors due to sampling at a less than optimum phase. Should it be deemed unnecessary to adjust the phase automatically, the bit synchronizer may comprise a simple selector switch coupling one selected tap through to the bit stream combiner 132.

MLD 52 operates by having the bit synchronizer 138 examine the data bits as they pass along the shift register 130. The time relationship between the rising edges and the falling edges of the data bits are compared to those of the system clock. Based upon the calculations made by the bit synchronizer 138, the appropriate shift register tap among the eight possible taps 142-156 is used to extract the data and send it to the bit stream combiner 132. This calculation estimates the center of the data bit.

The center of the data bit must be known relative to the system clock. (The system clock is derived from the high speed clock 136 which also runs the shift register 130.) The bit synchronizer 138 examines one of the lines 142-156 and notes when the edges of the data bits occur with respect to each other and with respect to the system clock. The time relationships are measured in terms of the periods of the high speed clock 136. This examination occurs on the first portion of the incoming data stream which has a preamble especially designed to ease the task of the bit synchronizer (usually a 1 0 1 0 1 0 1 0 sequence) and also to allow the synchronization process to occur before the message bits arrive.

Referring again to FIG. 4, the data clock, consisting of two phases CLK phase 1 and CLK phase 2, at the nodes is derived from the bit rate of the continuous downstream bit rate transmitted by the head end 14. Thus, the burst transmissions from the nodes 16, 18 to the head end 14 are at a frequency known to the head end 14 but at an unknown phase. Once the MLD 52 determines the phase, that phase is constant throughout the burst transmission from the node 16 or 18. Therefore, once the MLD 52 ascertains the phase of the preamble it does not make any further adjustments for the remainder of the burst transmission from the node 16 or 18.

The center of the bit times are calculated by taking the bit period, that is, the time between the start and the end of a bit as measured in high speed clock 136 periods, and dividing by two. This measurement can be made by a counter within bit synchronizer 138 which is started when a bit transition occurs and is stopped when the next transition occurs. A similar counting method can be used to determine the time relationship between the bit edges and the master clock edges. The appropriate shift register 130 output 142-156 to take the data from is found from the time relationships between the data edges and the master clock edge. The implementation can be done from a look-up table in a memory within the bit synchronizer 138 or can be calculated in real time with either hardwired logic or a fast dedicated microprocessor.

Within the transmitter 40, the output of the equalizer 124 through the attenuator 126 is provided to a mixer 127, the output of which is coupled to the amplifier 128. The mixer 127 is coupled to a frequency synthesizer 29 which supplies the local oscillator signal used to select the channel for the downstream channel 12D.

Figure 4:
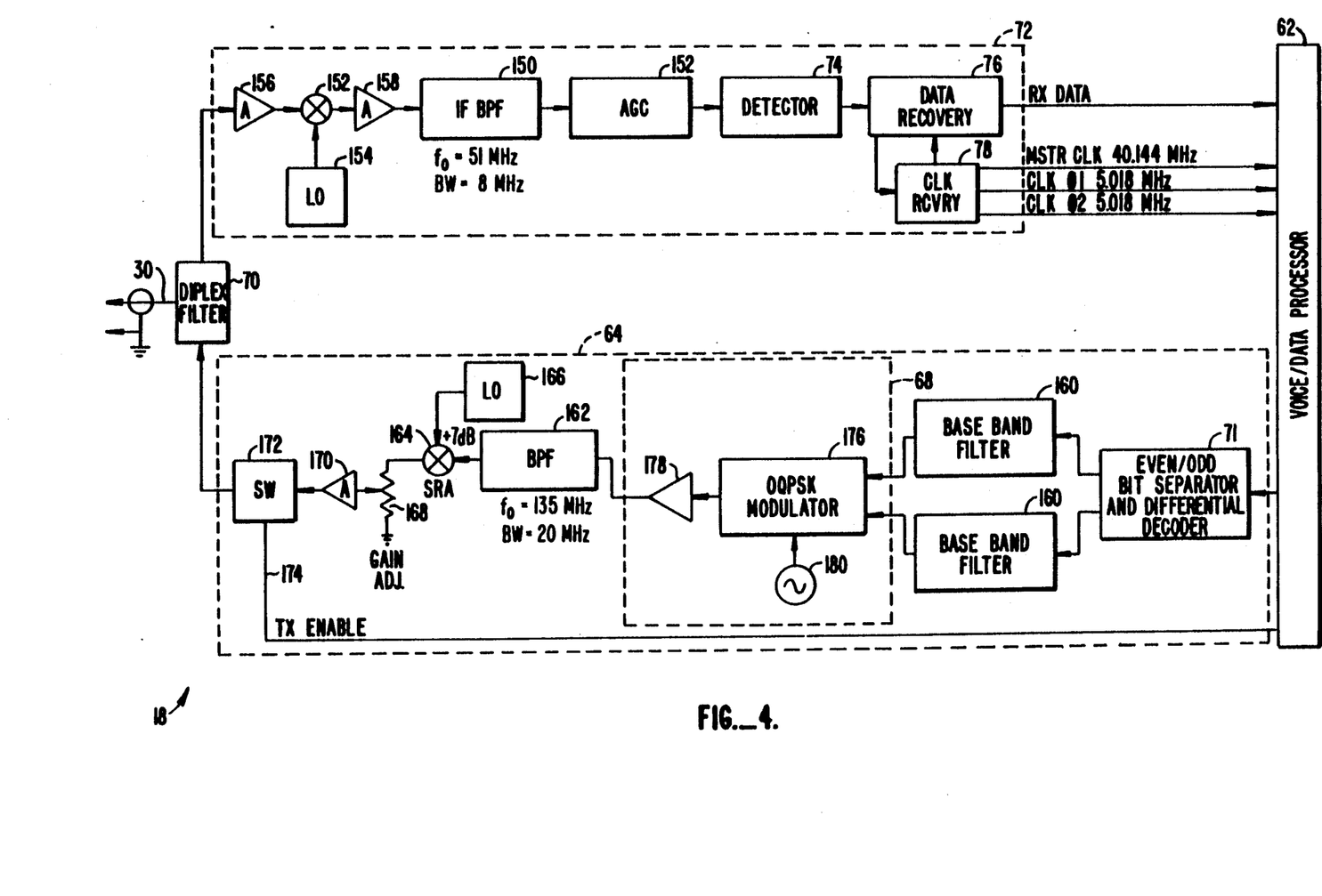
FIG. 4 is a detailed block diagram of the rf section of a remote node for reception of a signal from the central control node and for transmission of a signal to the central control node according to the invention.

Referring now to FIG. 4, there is shown a detailed block diagram of the RF section of a node device, for example, node device B 18 in accordance with the invention, having a receiver 72, a diplexer 70 and transmitter 64 and voice/data/processor 62. Understanding of the voice/data processor 62 is not necessary to understand the present invention. Its function is to provide transmit data to the transmitter 64, together with any clock signals and control signals, and to receive data from the receiver 72, as well as a master clock signal and other related clock signals.

Referring to the receiver 72, there is shown a simple detector 74 with decoder 76 and clock recovery circuit 78. The circuitry operates at an intermediate frequency, and to this end is provided with an intermediate frequency bandpass filter 150 with a center frequency of 57 MHz and a bandwidth of 6 MHz. It is coupled to receive a signal from a mixer 152 which is coupled to receive a local oscillator signal from a local oscillator 154 and the information-carrying signal through a buffer amplifier 156. The output of the IF bandpass filter 150 is coupled to an automatic gain control circuit 152. The output of the automatic gain control circuit 152 is coupled to the detector 74, which may be a diode type envelope detector. A data recovery circuit 76 is coupled to received the output of the envelope detector 74.

The signal received through the diplex filter 70 is a partial response three level class one signal, which has a desired a one bit per Hertz spectral efficiency. The class 1 partial response format is an ideal format for a simple modulator and demodulator so long as the system is operating in a continuous mode. The operation in a continuous mode allows the incoming signal to produce an AGC signal at the AGC circuit 152 providing compensation for the dynamic range of variations which can be expected at the input. The data recovery circuit is a simple bit synchronous detector which allows recovery of the bit stream in connection with the recovered clock signal from a clock recovery circuit 78. The data recovery circuit may, for example, be a J-K flipflop clocked by a recovered clock signal, where its output is fed to a suitable buffer of the voice/data processor 62. The clock recovery circuit 78, may be a voltage controlled oscillator which is steered or triggered by the edge of the transitions derived from data extracted from the data recovery circuit.

The transmitter 64 comprises a even/odd bit separator and differential encoder 71 coupled through a bandpass filter 160 to a burst modulator 68. The output of the burst modulator 68, which is an analog phase locked loop, is coupled to a bandpass filter 162, the output of which is coupled through a mixer 164 which is coupled to a local oscillator 166. The output of the mixer 164 is provided through a gain adjustment circuit 168 to an output amplifier 170, and the output amplifier 170 is fed through a PIN switch 172 to the diplex filter 70. The PIN switch 172 is controlled by a transmit enable line 174 and is used to gate the signal burst applied through the diplex filter 70 to the tap transmission line 30.

The burst modulator 68 comprises an offset quadrature phase shift keyed (OQPSK) modulator 176 whose data is taken from the two baseband filters 160 and whose carrier is taken from oscillator 180. The QPSK modulator 176 is of a design wherein the carrier signal is split into two components in quadrature phase relation and then provided to mixers which, in turn, are mixed with input data bit streams which are inherently offset by one-half bit period. The resultant mixer outputs are recombined in an output modulated bit stream. The output modulated bit stream from the OQPSK modulator 176 is amplified by amplifier 178 before being sent to the bandpass filter 162.

When there is data being received from the voice/data processor 62, it turns on the switch 172 which allows a signal to be sent to the diplex filter 70. The even/odd bit separator and differential decoder 168 then receives data from the voice/data processor 62 and passes it to the burst transmitter 68 via the identical baseband filters 160. This offset quadrature phase shift keyed signal modulates the burst transmitter 68 between four possible phases. At the end of a data packet, the switch 172 is turned off.

The invention has now been explained with reference to specific embodiments. Other embodiments will be apparent to those of ordinary skill in this art. Therefore, this invention is not to be limited except as indicated by the appended claims.

We claim:

1. A communication system comprising:
   a head end device coupled to receive and translate bursts of information received in a partial response format into continuous information in a partial response format and to transmit said continuous information;
   a first communications medium coupled to said head end device for conveying said bursts of information to said head end device;
   a second communications medium coupled to said head end device for conveying said continuous information; and
   a plurality of node devices, each one of said node devices having modulator means coupled to said first communications medium for transmitting signals upstream to said head end device and having demodulator means coupled to said second communications medium for receiving signals downstream from said head end device, each said modulator means comprising means for communicating bursts of information in an offset quadrature phase shift keyed (OQPSK) format, and each said demodulator means comprising means for receiving continuous information in an AM-PSK format.

2. The communication system of claim 1 wherein said modulator means comprises means for transmitting said bursts of information with an efficiency of one bit per Hertz.

3. The communication system of claim 2 wherein said head end device means comprises means for transmitting said continuous information with an efficiency of one bit per Hertz.

4. The communication system of claim 3 wherein said first communication medium is a first broadband communication medium and said second communication medium is a second broadband communication medium, wherein said first broadband communication medium and said second broadband communication medium are separate frequency channels on a single physical medium and said head end device includes a frequency translation means.

5. The communication system of claim 4 wherein said head end translating mean further comprises means for aligning in time a first bit pattern of said information of said OQPSK modulator means to synchronize said bit pattern of said information with a repetitive bit pattern in order to allow extracting of bits at an optimized time.

6. A method for transmitting information in a bit pattern from a source node to a target node in a communication system having a unidirectional transmitting medium terminating at a head end said information being translated at said head end onto a unidirectional receiving medium originating from said head end, comprising the steps of:
   transmitting said information as an offset quadrature phase shift keyed (OQPSK) signal on a carrier on said transmitting medium from said source node;
   receiving said OQPSK with an OQPSK receiver at said head end to obtain a received signal;
   hard limiting said received signal with a limiter circuit means to obtain a limited signal within a defined dynamic range;
   transmitting continuously a class one, three-level partial response signal on a continuous carrier on said receiving medium from said head end;
   modulating said continuous carrier with said bit pattern of said information when said bit pattern of said information is present and modulating said continuous carrier with a repetitive bit pattern when said bit pattern of said information is not present;
   receiving said continuous carrier at said target node on said receiving medium;
   detecting said modulated continuous carrier with an envelope detector means; and
   extracting said bit pattern of said information from said modulated continuous carrier by strobing said bit pattern in synchronism with a system clock.

7. The method of claim 6 further comprising the step of aligning in time said bit pattern of said information at said head end to synchronize said bit pattern of said information with said repetitive bit pattern in order to allow extracting of bits at an optimized time.

8. The method of claim 6 wherein said OQPSK signal transmitting step includes asynchronously transmitting said information in bursts.

9. A communication system for transmitting a unit of information in a bit pattern from a source node to a set of target nodes comprising:
   a head end;
   a unidirectional transmitting medium coupling each node in a source path to and terminating at said head end;
   a unidirectional receiving medium originating from said head end and coupling to each said target node;
   means at said source node for transmitting said information as an offset quadrature phase shift keyed (OQPSK) signal on a carried on a transmitting bus from said node; said head end comprising:
   a) head end receiving means at said head end for receiving said OQPSK signal with an OQPSK receiver at said head end to obtain a received signal, said head end receiving means including a limiter circuit means for hard limiting said received signal to obtain a limited signal within a defined range; and
   b) head end translating means for transferring signals received at said head end of said transmitting medium to said receiving medium;
   c) means for transmitting continuously a class one, three-level partial response signal on a continuous carrier on said receiving medium from said head end; and
   d) means for modulating said continuous carrier with said bit pattern of said information when said bit pattern of said information is present and modulating said continuous carrier with a repetitive bit pattern when said bit pattern of said information is not present; and target node receiving means for receiving said continuous carrier at said target node on said receiving medium, said target node receiving means including:

a) envelope detector means for detecting said modulated continuous carrier; and
b) analog to digital converting means for extracting said bit pattern of said information from said carrier by strobing said bit pattern in synchronism with a system clock.

10. The communication system of claim 9 wherein said head end translating means further comprises means for aligning in time a bit pattern of said information to synchronize said bit pattern of said information with said repetitive bit pattern in order to allow extracting of bits at an optimized time.

11. The communication system of claim 9 further comprising means, coupled to said source node, for digitizing a voice signal to produce said information.

12. The communication system of claim 11 wherein said transmitting medium and said receiving medium are separate frequency channels on a single physical medium and said translating means includes a frequency translator.

13. The communication system of claim 12 further comprising a plurality of transmitting and receiving channels on said physical medium, each of said nodes having means for transmitting and receiving on more than one channel.

* * * * *